(12) United States Patent
Samardzija et al.

(10) Patent No.: US 12,684,351 B2
(45) Date of Patent: Jul. 14, 2026

(54) CREATING AND IMPLEMENTING A WI-FI SHARING COMMUNITY

(71) Applicant: Plume Design, Inc., Palo Alto, CA (US)

(72) Inventors: Miroslav Samardzija, Mountain View, CA (US); Paul White, Burlingame, CA (US); Dariusz Kopka, Warsaw (PL); Quang Nguyen, San Jose, CA (US); Abinash Mahapatra, Cupertino, CA (US); Nathaniel C. Amarose, San Francisco, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 340 days.

(21) Appl. No.: 18/149,090

(22) Filed: Dec. 31, 2022

(65) Prior Publication Data

US 2024/0224031 A1    Jul. 4, 2024

(51) Int. Cl.
*H04W 12/069* (2021.01)
*H04W 12/084* (2021.01)
*H04W 84/12* (2009.01)

(52) U.S. Cl.
CPC ....... *H04W 12/069* (2021.01); *H04W 12/084* (2021.01); *H04W 84/12* (2013.01)

(58) Field of Classification Search
CPC . H04W 12/06; H04W 12/069; H04W 12/084; H04W 12/08; H04W 84/12
See application file for complete search history.

(56) References Cited

U.S. PATENT DOCUMENTS

| | | | |
|---|---|---|---|
| 6,853,197 | B1 | 2/2005 | McFarland et al. |
| 6,961,545 | B2 | 11/2005 | Tehrani et al. |
| 7,245,882 | B1 | 7/2007 | McFarland |
| 7,245,893 | B1 | 7/2007 | Husted et al. |
| 7,251,459 | B2 | 7/2007 | McFarland et al. |
| 9,136,937 | B1 | 9/2015 | Cheng et al. |
| 9,160,584 | B1 | 10/2015 | Kavousian et al. |
| 9,680,753 | B2 | 6/2017 | Malkin et al. |
| 10,051,455 | B2 | 8/2018 | Jeng et al. |
| 10,178,578 | B1 | 1/2019 | Mcfarland et al. |

(Continued)

FOREIGN PATENT DOCUMENTS

WO      2017148354 A1    8/2017

OTHER PUBLICATIONS

International Search Report and Written Opinion to corresponding International Application No. PCT/US2023/085293.

*Primary Examiner* — Jinsong Hu
*Assistant Examiner* — Farideh Madani
(74) *Attorney, Agent, or Firm* — Nicholas Martin; Greenberg Traurig, LLP

(57)        ABSTRACT

Systems and methods for creating and implementing a Wi-Fi sharing community or global Wi-Fi network are provided. According to one implementation, a method includes a step of providing, for an owner of each of a plurality of independent Wi-Fi networks, an opportunity to enroll as a member of a Wi-Fi sharing community. For enrollment, each member agrees to designate a portion of bandwidth of the member's Wi-Fi network for use by other members as a hotspot. Also, the method includes a step of issuing a digital certificate to each member to allow the member to utilize any Wi-Fi network in the Wi-Fi sharing community.

19 Claims, 11 Drawing Sheets

(56) References Cited

U.S. PATENT DOCUMENTS

| | | | |
|---|---|---|---|
| 10,299,405 B2 | 5/2019 | Chang et al. | |
| 10,420,155 B2 | 9/2019 | Hu et al. | |
| 10,777,877 B2 | 9/2020 | Su et al. | |
| 11,234,166 B2 | 1/2022 | Mcfarland et al. | |
| 2013/0007853 A1* | 1/2013 | Gupta | H04W 12/069 |
| | | | 726/5 |
| 2013/0090057 A1 | 4/2013 | Green et al. | |
| 2013/0293424 A1 | 11/2013 | Zhu et al. | |
| 2014/0009344 A1 | 1/2014 | Zhu et al. | |
| 2014/0009355 A1 | 1/2014 | Samardzija et al. | |
| 2014/0112511 A1 | 4/2014 | Corbin et al. | |
| 2014/0226572 A1 | 8/2014 | Thota et al. | |
| 2014/0340265 A1 | 11/2014 | Vazquez et al. | |
| 2015/0099474 A1 | 4/2015 | Yarga et al. | |
| 2015/0109167 A1 | 4/2015 | Yarga et al. | |
| 2015/0195836 A1 | 7/2015 | Malkin et al. | |
| 2015/0302976 A1 | 10/2015 | Chang et al. | |
| 2015/0303568 A1 | 10/2015 | Yarga et al. | |
| 2015/0311960 A1 | 10/2015 | Samardzija et al. | |
| 2016/0056526 A1 | 2/2016 | Li et al. | |
| 2016/0336643 A1 | 11/2016 | Pascolini et al. | |
| 2017/0142680 A1 | 5/2017 | Malkin et al. | |
| 2017/0272273 A1 | 9/2017 | Singla et al. | |
| 2018/0115946 A1* | 4/2018 | Baltar | H04W 84/12 |
| 2018/0205831 A1* | 7/2018 | Varsavsky Waisman-Diamond | H04M 15/8055 |
| 2018/0342784 A1 | 11/2018 | Samardzija et al. | |
| 2019/0044896 A1* | 2/2019 | Sherkin | H04L 9/0891 |
| 2019/0104411 A1 | 4/2019 | Hotchkiss et al. | |
| 2019/0171259 A1 | 6/2019 | Mcfarland et al. | |
| 2019/0174336 A1 | 6/2019 | Mcfarland et al. | |
| 2019/0387415 A1* | 12/2019 | Scahill | H04W 16/26 |
| 2021/0029559 A1 | 1/2021 | Agarwal et al. | |
| 2021/0076216 A1 | 3/2021 | Hotchkiss et al. | |
| 2021/0195441 A1 | 6/2021 | Agarwal et al. | |
| 2021/0195442 A1 | 6/2021 | Agarwal et al. | |
| 2021/0195443 A1 | 6/2021 | Agarwal et al. | |
| 2021/0243603 A1* | 8/2021 | Yin | H04W 12/08 |
| 2021/0392576 A1* | 12/2021 | Ergen | H04M 15/8038 |
| 2022/0217550 A1 | 7/2022 | Sakamoto et al. | |
| 2022/0255799 A1 | 8/2022 | Singla et al. | |
| 2022/0256340 A1* | 8/2022 | Lee | H04M 15/51 |
| 2022/0279429 A1 | 9/2022 | Agarwal et al. | |

* cited by examiner

PROVISIONING &
OPTIMIZATION

INTERNET 12

CLOUD
SERVICE
40

MODEM/ROUTER 30

WI-FI NETWORK 10

16

PROVISIONING &
OPTIMIZATION

INTERNET  —12

CLOUD
SERVICE

40

30

MODEM/ROUTER

GbE

22B

22A

BACKHAUL LINK

22C

22D

16C

22E

CLIENT LINK 16A      16B

16D

22F

22G

16E

22H

LOCAL SELF ORGANIZATION
TO CONNECT TO CLOUD

10D

_FIG. 3A_

_FIG. 3B_

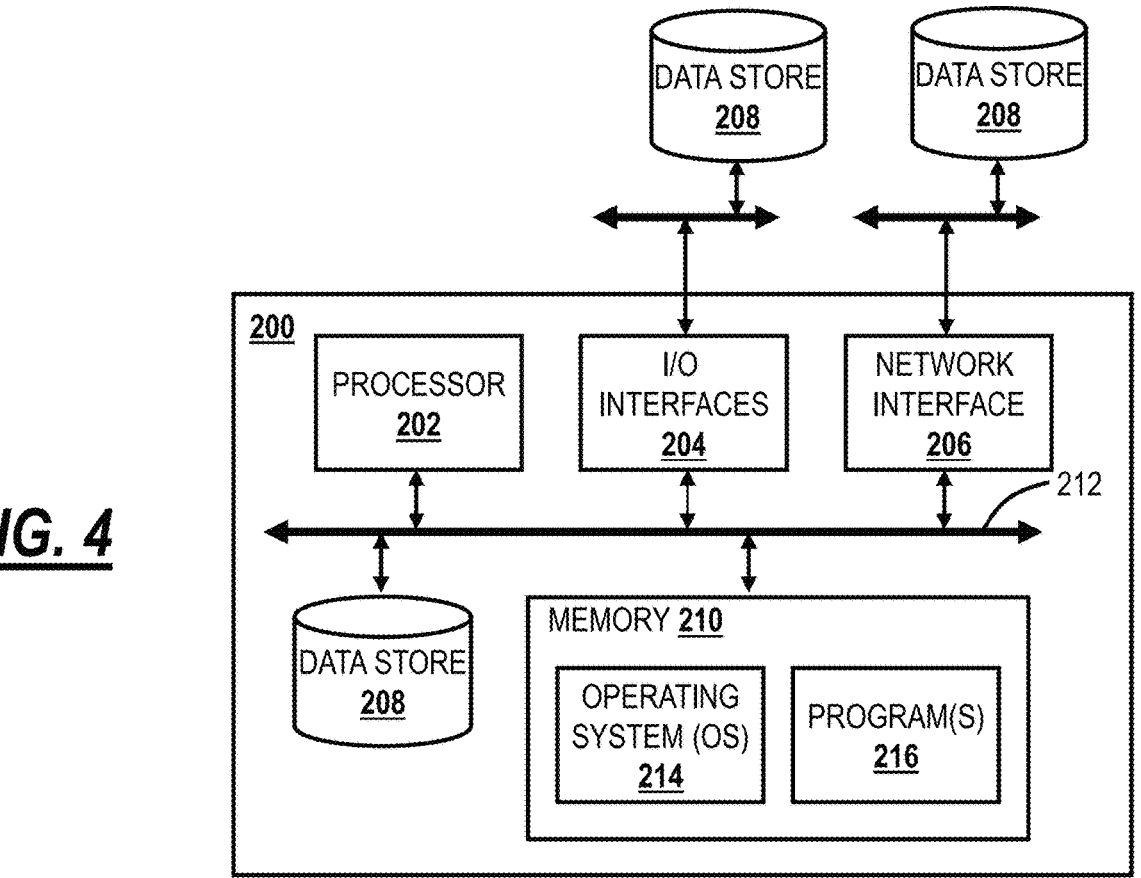
_FIG. 4_

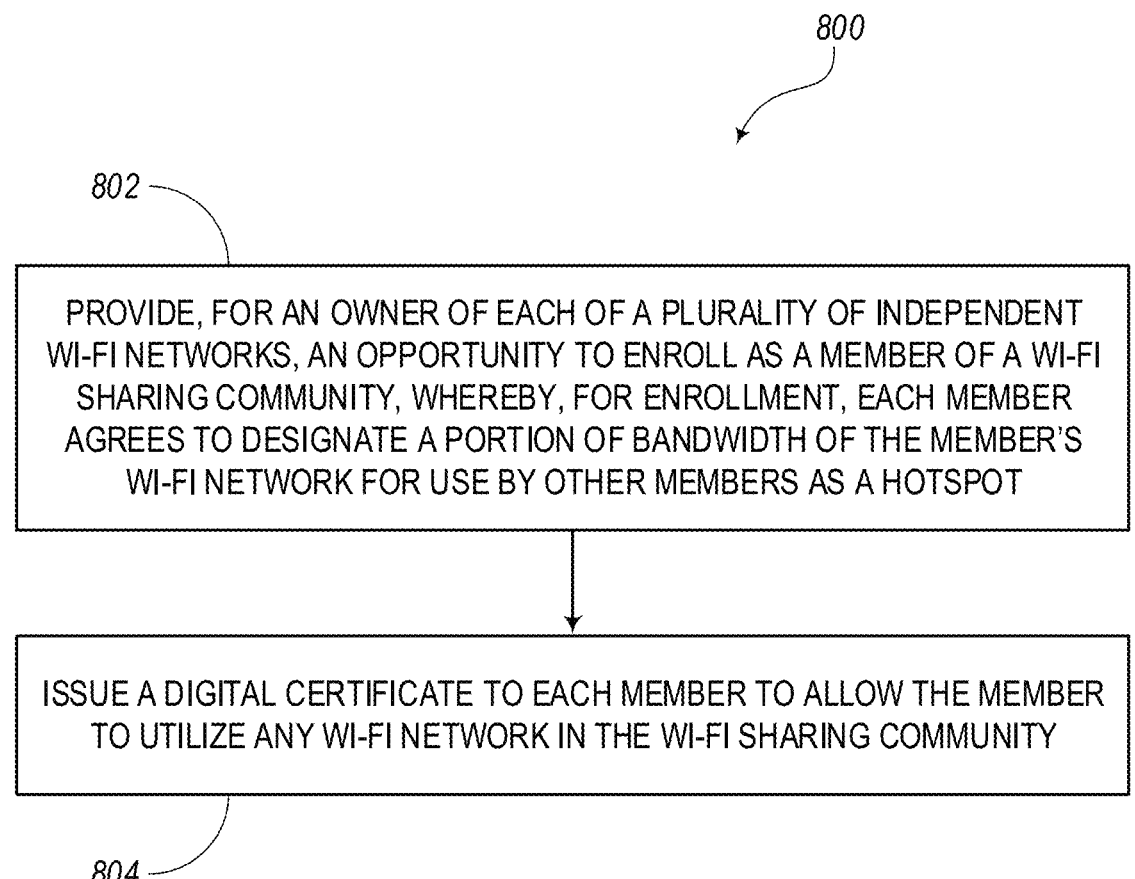

_800_

_802_

PROVIDE, FOR AN OWNER OF EACH OF A PLURALITY OF INDEPENDENT WI-FI NETWORKS, AN OPPORTUNITY TO ENROLL AS A MEMBER OF A WI-FI SHARING COMMUNITY, WHEREBY, FOR ENROLLMENT, EACH MEMBER AGREES TO DESIGNATE A PORTION OF BANDWIDTH OF THE MEMBER'S WI-FI NETWORK FOR USE BY OTHER MEMBERS AS A HOTSPOT

ISSUE A DIGITAL CERTIFICATE TO EACH MEMBER TO ALLOW THE MEMBER TO UTILIZE ANY WI-FI NETWORK IN THE WI-FI SHARING COMMUNITY

_804_

_FIG. 10_

CREATING AND IMPLEMENTING A WI-FI SHARING COMMUNITY

FIELD OF THE DISCLOSURE

The present disclosure generally relates to wireless networking systems and methods. More particularly, the present disclosure relates to systems and methods for enabling owners of independent Wi-Fi networks to enroll in a Wi-Fi sharing community to allow members to use any participating Wi-Fi network.

BACKGROUND OF THE DISCLOSURE

Wi-Fi networks (i.e., wireless local area networks (WLAN) based on the IEEE 802.11 standards) are ubiquitous, and the primary network used in homes. In fact, Wi-Fi is the most common technique for user device connectivity, and the applications that run over Wi-Fi are continually expanding. For example, Wi-Fi is used to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. That is, Wi-Fi has become the primary connection between user devices and the Internet in the home or other locations. The vast majority of connected devices use Wi-Fi for their primary network connectivity.

Normally, a Wi-Fi network is associated with a single residence or business. A Wi-Fi network is usually only used by the people living at the residence or the workers or customers present at the business location. However, the coverage area of a Wi-Fi network is usually limited to the extent of the modems and access points set up in the residence or business. Since people typically tend to need Wi-Fi service at more locations than just their residence, there is a need to expand the scope of Wi-Fi coverage to enable more roaming opportunities.

BRIEF SUMMARY OF THE DISCLOSURE

The present disclosure relates to systems and methods for creating and implementing a Wi-Fi sharing community or global Wi-Fi network. A method, according to one implementations, includes the step of providing, for an owner of each independent Wi-Fi network, an opportunity to enroll as a member of a Wi-Fi sharing community. For enrollment, each member agrees to designate a portion of bandwidth of the member's Wi-Fi network for use by other members as a hotspot. Also, the method includes the step of issuing a digital certificate to each member to allow the member to utilize any Wi-Fi network in the Wi-Fi sharing community.

The method may also include the step of allowing each member to enter a value equal to a maximum percentage of the respective Wi-Fi network that can be designated for use by other members. The method may also create one or more membership files to include membership information and digital certificates of the members in the Wi-Fi sharing community. For example, the membership files may be created using blockchain technology.

In addition, the method may also include the step of creating one or more digital ledgers configured to record a number of digital tokens in an account associated with each member. When a first member uses a Wi-Fi network of a second member, for example, the method may include a) deducting a first number of digital tokens from the first member's account, and b) crediting a second number of digital tokens to the second member's account. The method may also include a) receiving metrics tracked by the second member's Wi-Fi network, where the metrics may be related to the first member's use of the second member's Wi-Fi network, and b) determining the first and second numbers (described above) based on metrics. The metrics may include one or more of an amount of time that the first member used the second member's Wi-Fi network, an amount of bandwidth used, and an amount of data consumed. In some embodiments, the first number may be the same as the second number. The method may also include the step of creating the one or more digital ledgers using blockchain technology. Also, the method may include allowing the members to exchange digital tokens in their respective account in order to purchase or receive discounts on hardware, software, goods, services, currency, and/or cryptocurrency.

When a member is roaming, the method may be configured to seamlessly hand off the member's connectivity from a first Wi-Fi network either to a second Wi-Fi network or to a cellular network. This step of seamlessly handing off the member's connectivity may be performed automatically without user intervention or login actions. The method may also include the steps of a) receiving the digital certificate associated with the roaming member from the second Wi-Fi network based on a permission request provided by a user device of the roaming member to the second Wi-Fi network, and b) upon validating that the digital certificate associated with the roaming member is legitimate, signaling the second Wi-Fi network to permit connectivity of the user device of the roaming member with the second Wi-Fi network. The method may utilize a RADIUS server for assisting with validation of digital certificates. Also, the method may include the step of sending information about an amount of available roaming connectivity credits associated the roaming member to the second Wi-Fi network to limit usage of the second Wi-Fi by the roaming member.

The plurality of independent Wi-Fi networks as described herein may be located in multiple countries, governmental jurisdictions, or service areas. Also, the Wi-Fi sharing community may be established whereby the members do not incur roaming penalties for using Wi-Fi networks of other members in different countries, governmental jurisdictions, or service areas. The method may also allow each member to use a related user device to temporarily toggle off participation in the Wi-Fi sharing community as desired.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3A is a block diagram of functional components of the access points, mesh nodes, repeaters, etc., in the Wi-Fi networks of FIG. 1.

FIG. 3B is a logical diagram of the access points, mesh nodes, repeaters, etc. with a middleware layer to enable operation with the cloud service.

FIG. 4 is a block diagram of functional components of a server, a Wi-Fi client device, or a user device that may be used with the Wi-Fi network of FIG. 1 and/or the cloud-based control of FIG. 2A.

FIG. 10 is a diagram illustrating an embodiment of a method for enabling a member to join a Wi-Fi sharing community.

DETAILED DESCRIPTION OF THE DISCLOSURE

The present disclosure is directed to systems and methods for enabling owners of Wi-Fi networks to join a global Wi-Fi sharing network in which members agree to share at least a portion of their Wi-Fi network with other members and where the members can also benefit by using the Wi-Fi networks of other members as needed. This community of Wi-Fi networks can be referred to as a Wi-Fi sharing community. Embodiments of the Wi-Fi sharing community are described below with respect to §§ 5.0-5.3.

§ 1.0 WI-FI NETWORK TOPOLOGIES

Figure 1:
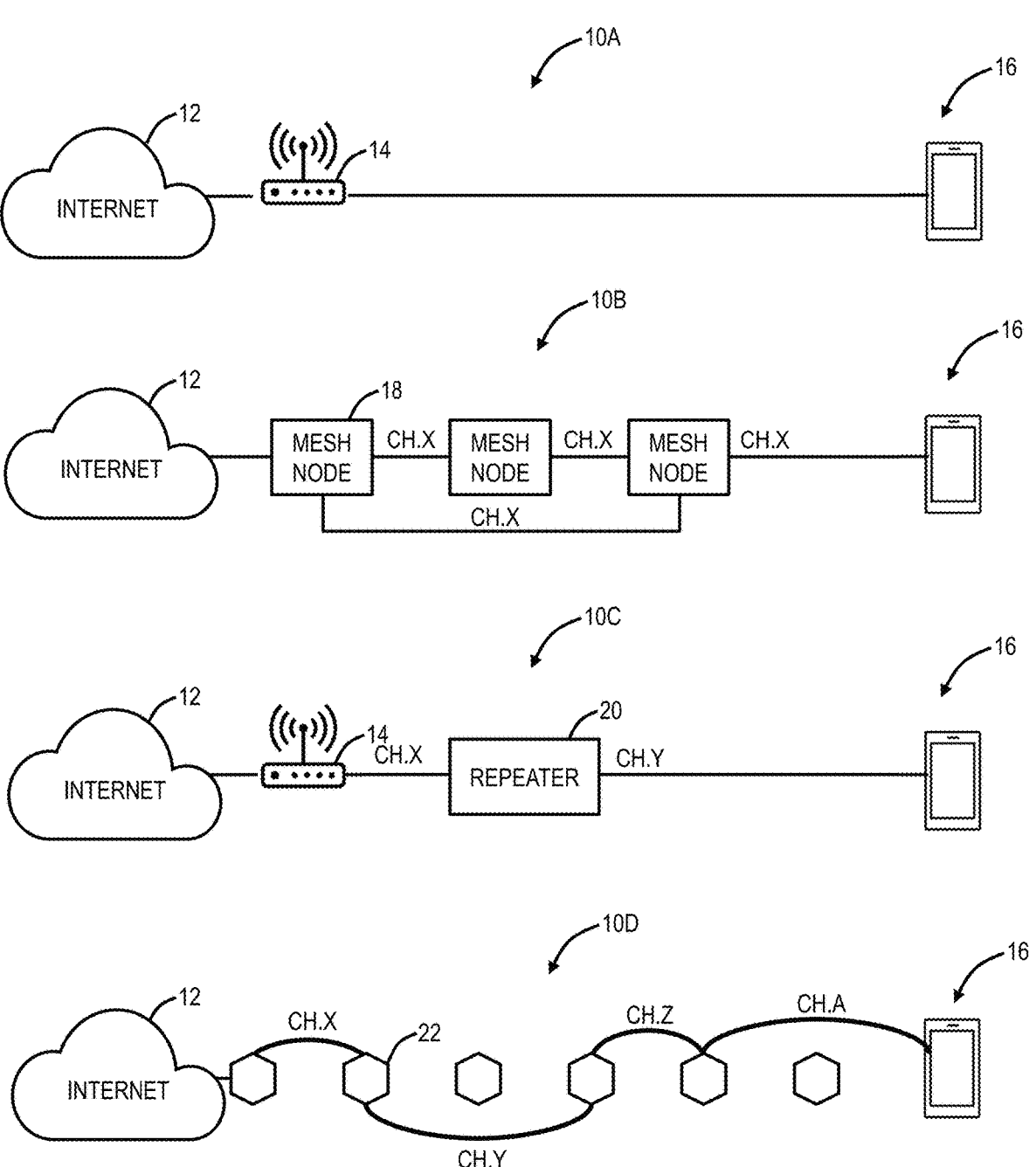
FIG. 1 is a network diagram of various Wi-Fi network topologies for connectivity to the Internet.

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to Wi-Fi client devices 16 which can be referred to as client devices, user equipment, user devices, clients, Wi-Fi clients, Wi-Fi devices, etc. Note, those skilled in the art will recognize the Wi-Fi client devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all Wi-Fi client devices 16 in a location. Of course, a typical location can have several walls, floors, etc. between the single access point 14 and the Wi-Fi client devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the Wi-Fi client device 16. That is, the Wi-Fi network 10B is a fully interconnected grid, sharing the same channel, and allowing multiple different paths between the mesh nodes 18 and the Wi-Fi client device 16. However, since the Wi-Fi network 10B uses the same backhaul channel, every hop between source points divides the network capacity by the number of hops taken to deliver the data. For example, if it takes three hops to stream a video to a Wi-Fi client device 16, the Wi-Fi network 10B is left with only ⅓ the capacity.

The Wi-Fi network 10C includes the access point 14 coupled wirelessly to a Wi-Fi repeater 20. The Wi-Fi network 10C with the repeaters 20 is a star topology where there is at most one Wi-Fi repeater 20 between the access point 14 and the Wi-Fi client device 16. From a channel perspective, the access point 14 can communicate to the Wi-Fi repeater 20 on a first channel, Ch. X, and the Wi-Fi repeater 20 can communicate to the Wi-Fi client device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wi-Fi client devices 16.

The Wi-Fi network 10D includes various Wi-Fi devices 22 that can be interconnected to one another wirelessly (Wi-Fi wireless backhaul links) or wired, in a tree topology where there is one path between the Wi-Fi client device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the Wi-Fi client device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the Wi-Fi client device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

§ 1.1 Cloud-Based Control

Figure 2A:
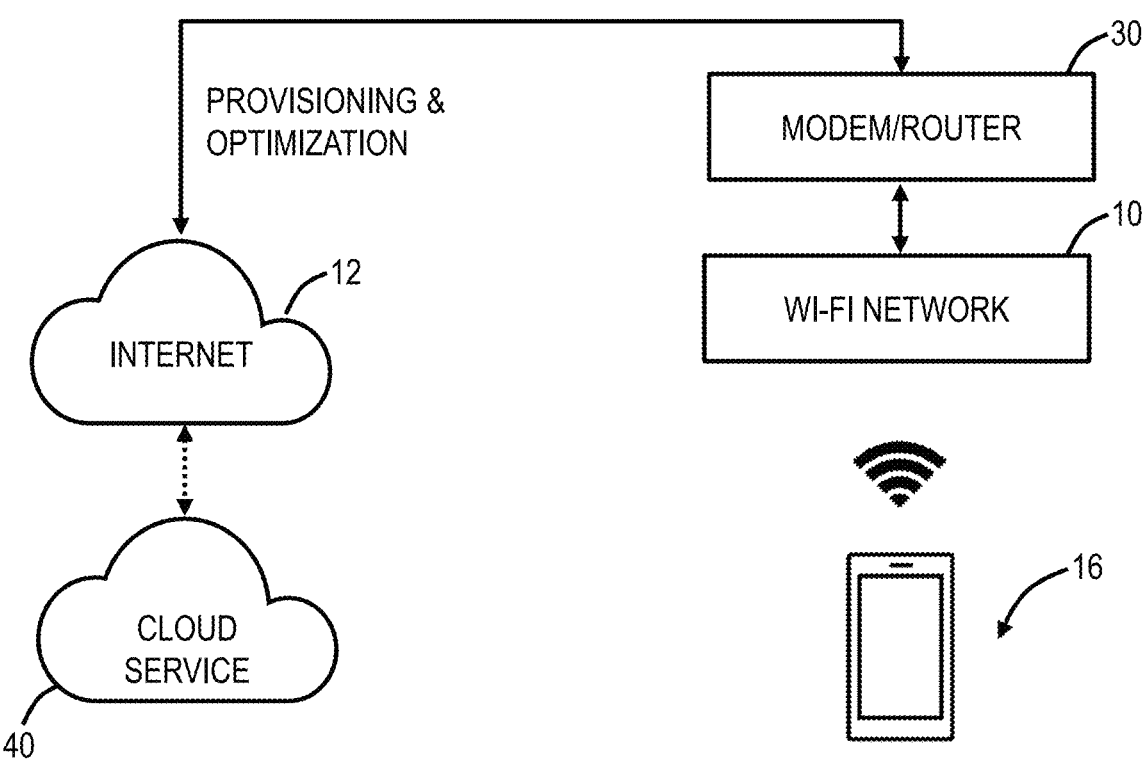
FIG. 2A is a network diagram of the Wi-Fi network with cloud-based control.

FIG. 2A is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 30 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Of note, cloud-based control can be implemented with any of the Wi-Fi networks 10, with monitoring through the cloud service 40. For example, different vendors can make access points 14, mesh nodes 18, repeaters 20, Wi-Fi devices 22, etc. However, it is possible for unified control via the cloud using standardized techniques for communication with the cloud service 40. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40. This is used to collect measurements and statistics from the connected Wi-Fi client devices 16 and network management elements, and to enable customized connectivity services.

As described herein, cloud-based management includes reporting of Wi-Fi related performance metrics to the cloud service 40 as well as receiving Wi-Fi-related configuration parameters from the cloud service 40. The systems and methods contemplate use with any Wi-Fi network 10. The cloud service 40 utilizes cloud computing systems and methods to abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

§ 1.2 Distributed Wi-Fi Network

Figure 2B:
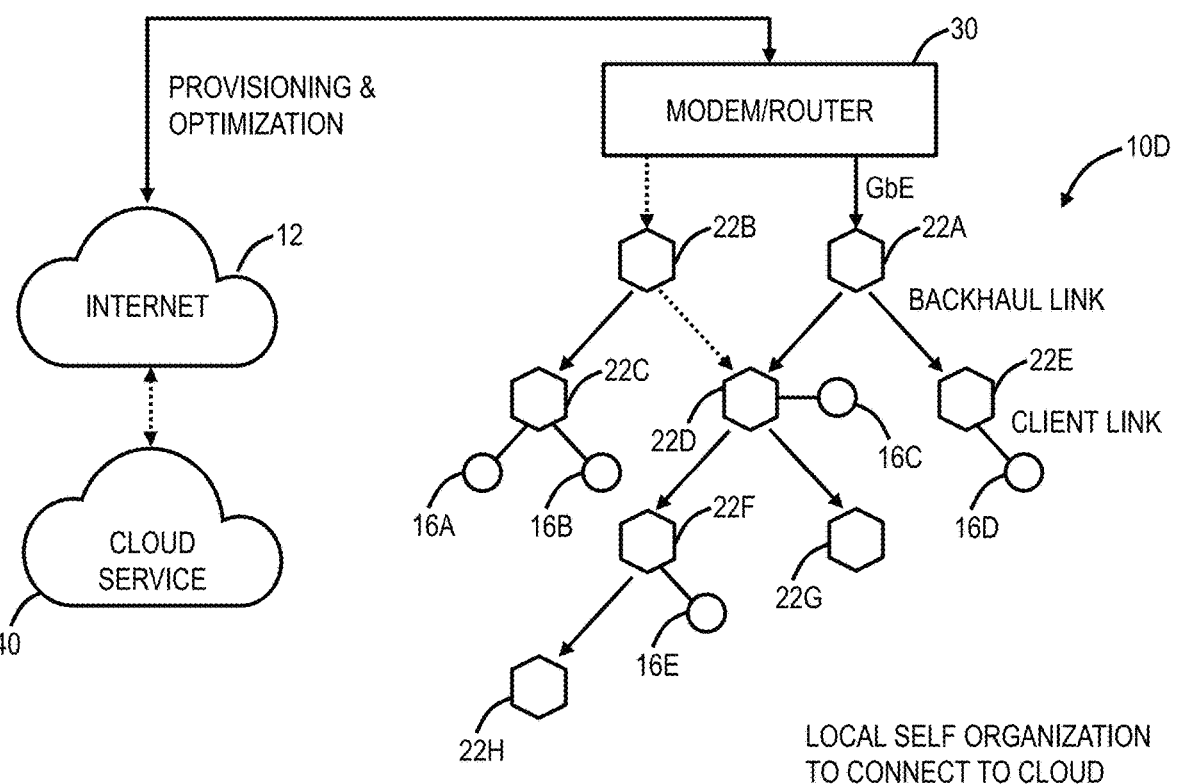
FIG. 2B is a network diagram of an example implementation of the Wi-Fi network, as a distributed Wi-Fi network in a tree topology.

FIG. 2B is a network diagram of an example implementation the Wi-Fi network 10D, as a distributed Wi-Fi network in a tree topology. The distributed Wi-Fi network 10D includes a plurality of access points 22 (labeled as access points 22A—22H) which can be distributed throughout a location, such as a residence, office, or the like. That is, the distributed Wi-Fi 10D contemplates operation in any physical location where it is inefficient or impractical to service with a single access point, repeaters, or a mesh system. In a typical deployment, the distributed Wi-Fi network 10D can include between 1 to 12 access points or more in a home. A large number of access points 22 (which can also be referred to as nodes in the distributed Wi-Fi system 10) ensures that the distance between any access point 22 is always small, as is the distance to any Wi-Fi client device 16 needing Wi-Fi service. That is, an objective of the distributed Wi-Fi network 10D is for distances between the access points 22 to be of similar size as distances between the Wi-Fi client devices 16 and the associated access point 22. Such small distances ensure that every corner of a consumer's home is well covered by Wi-Fi signals. It also ensures that any given hop in the distributed Wi-Fi network 10D is short and goes through few walls. This results in very strong signal strengths for each hop in the distributed Wi-Fi network 10D, allowing the use of high data rates, and providing robust operation.

For external network connectivity, one or more of the access points 14 can be connected to a modem/router 30 which can be a cable modem, Digital Subscriber Loop (DSL) modem, or any device providing external network connectivity to the physical location associated with the distributed Wi-Fi network 10D.

While providing excellent coverage, a large number of access points 22 (nodes) presents a coordination problem. Getting all the access points 22 configured correctly and communicating efficiently requires centralized control. This control is preferably done via the cloud service 40 that can be reached across the Internet 12 and accessed remotely such as through an application ("app") running on a client device 16. That is, in an exemplary aspect, the distributed Wi-Fi network 10D includes cloud-based control (with a cloud-based controller or cloud service) to optimize, configure, and monitor the operation of the access points 22 and the Wi-Fi client devices 16. This cloud-based control is contrasted with a conventional operation which relies on a local configuration such as by logging in locally to an access point. In the distributed Wi-Fi network 10D, the control and optimization does not require local login to the access point 22, but rather the Wi-Fi client device 16 communicating with the cloud service 4, such as via a disparate network (a different network than the distributed Wi-Fi network 10D) (e.g., LTE, another Wi-Fi network, etc.).

The access points 22 can include both wireless links and wired links for connectivity. In the example of FIG. 2B, the access point 22A has an exemplary gigabit Ethernet (GbE) wired connection to the modem/router 30. Optionally, the access point 22B also has a wired connection to the modem/router 30, such as for redundancy or load balancing. Also, the access points 22A, 22B can have a wireless connection to the modem/router 30. Additionally, the access points 22A, 22B can have a wireless gateway such as to a cellular provider as is described in detail herein. The access points 22 can have wireless links for client connectivity (referred to as a client link) and for backhaul (referred to as a backhaul link). The distributed Wi-Fi network 10D differs from a conventional Wi-Fi mesh network in that the client links and the backhaul links do not necessarily share the same Wi-Fi channel, thereby reducing interference. That is, the access points 22 can support at least two Wi-Fi wireless channels— which can be used flexibly to serve either the client link or the backhaul link and may have at least one wired port for connectivity to the modem/router 30, or for connection to other devices. In the distributed Wi-Fi network 10D, only a small subset of the access points 22 require direct connectivity to the modem/router 30 with the non-connected access points 22 communicating with the modem/router 30 through the backhaul links back to the connected access points 22A, 22B. Of course, the backhaul links may also be wired Ethernet connections, such as in a location have a wired infrastructure.

§ 2.0 ACCESS POINT

Figures 3A, 3B:
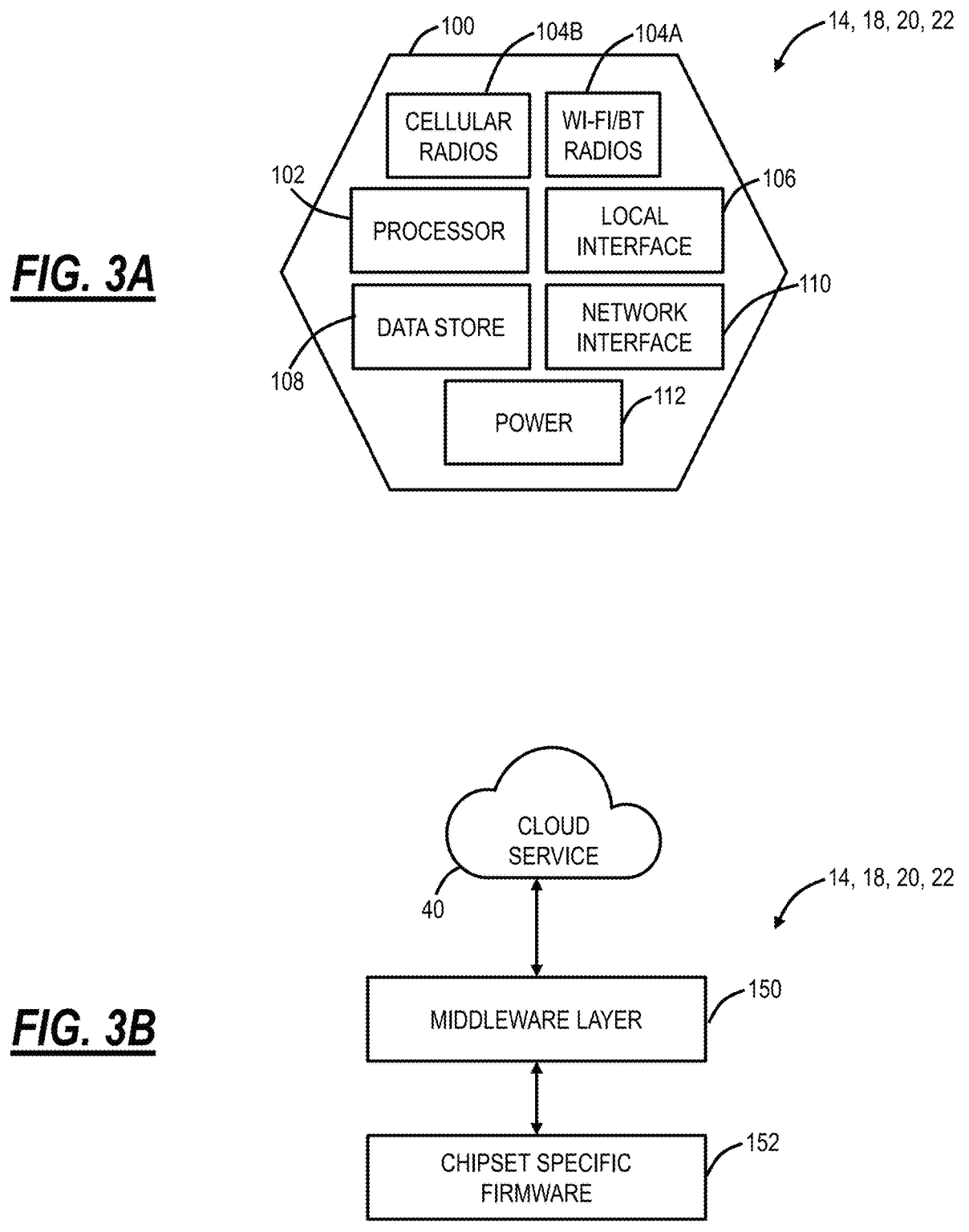

FIG. 3A is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 3A depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104B can operate according to the IEEE 802.11 standard. The radios 104B support cellular connectivity such as Long-Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104B such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6 GHz, as well as cellular connections. The radios 104B can include cellular chipsets and the like to support fixed wireless access.

Also, the radios 104A, 104B include antennas designed to fit in the form factor 100. An example is described in commonly-assigned U.S. patent Ser. No. 17/857,377, entitled "Highly isolated and barely separated antennas integrated with noise free RF-transparent Printed Circuit Board (PCB) for enhanced radiated sensitivity," filed Jul. 5, 2022, the contents of which are incorporated by reference in their entirety.

The local interface 106 is configured for local communication to the node and can be either a wired connection or wireless connection such as Bluetooth or the like. Since the node can be configured via the cloud service 40, an onboarding process is required to first establish connectivity for a newly turned on node. In an embodiment, the node can also include the local interface 106 allowing connectivity to a Wi-Fi client device 16 for onboarding to the Wi-Fi network 10 such as through an app on the user device 16. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 30. Also, the network interface 110 can be used to provide local connectivity to a Wi-Fi client device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Also, those skilled in the art will appreciate there can be various physical implementations which are contemplated herein. For example, in some embodiments, the modem/router 30 can be integrated with the access point 14, 18, 22. In other embodiments, just a router can be integrated with the access point 14, 18, 22 with separate connectivity to a modem.

§ 2.1 OpenSync

FIG. 3B is a logical diagram of the access points 14, mesh nodes 18, repeaters 20, etc. ("node") with a middleware layer 150 to enable operation with the cloud service 40. Of note, the present disclosure contemplates use with any vendor's hardware for the access points 14, mesh nodes 18, repeaters 20, etc. with the addition of the middleware layer 150 that is configured to operate with chipset specific firmware 152 in the node. In an embodiment, the middleware layer 150 is OpenSync, such as describe in www.opensync.io/documentation, the contents of which are incorporated by reference. Again, OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40.

The middleware layer 150 spans across layers from just above the firmware drivers to the cloud connection for the cloud service 40. The middleware layer 150 is software operates with the following device segments:

Measurements/Statistics/Telemetry

Collecting measurements reported by the low-level drivers

Compiling and pre-processing the measurements into statistics that are uniform across different devices Presenting the statistics using standardized formats Preparing the formatted statistics for transfer to the cloud using serialization and packetizing Communicating the statistics to the cloud using standardized and efficient telemetry Management/Control Defining a standard interface for control messaging from the cloud service 40

Providing operations necessary to manage the services, such as onboarding and provisioning Providing rules-based networking configurations to block, filter, forward, and prioritize the messages Implementing software to manage the device maintenance functions, including logging, firmware upgrades, and debugging Cloud-Managed Services Wi-Fi, including mesh networks that dynamically adapt to their environments User access management Cybersecurity Parental controls IoT device management Additional services Through use of the middleware layer 150, it is possible to have various different vendor devices operate with the cloud service 40.

§ 2.2 Virtual Network Functions (VNF) on the Access Points

In addition to the middleware layer 150, the present disclosure contemplates the ability for the cloud service 40 to add applications, features, etc. on the nodes. In the present disclosure, the node is configured to maintain tunnels to the corporate network as well as support forwarding based on virtual networks.

§ 2.3 SDN and OpenFlow

In an embodiment, the cloud service 40 can use software defined network (SDN) such as via OpenFlow to control the Wi-Fi networks 10 and the corresponding access points. OpenFlow is described at opennetworking.org and is a communications protocol that gives access to the forwarding plane of a network switch or router over the network. In this case, the forwarding plane is with the access points and the network is the Wi-Fi network 10. The access points and the cloud service can include with OpenFlow interfaces and Open vSwitch Database Management Protocol (OVSDB) interfaces. The cloud service 40 can use a transaction oriented reliable communication protocol such as Open vSwitch Database Management Protocol (OVSDB) to interact with the Wi-Fi networks 10.

The present disclosure includes multiple virtual networks in the Wi-Fi network 10 and one implementation can include SDN such as via OpenFlow.

§ 3.0 CLOUD SERVER AND USER DEVICE

FIG. 4 is a block diagram of functional components of a server 200, a Wi-Fi client device 16, or a user device that may be used with the Wi-Fi network of FIG. 1 or 2B, and/or the cloud-based control of FIG. 2A. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, InfiniBand, ISCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud service 40. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 3.1 App for Control

In general, a single app, such as a mobile app, desktop app, etc., can be used to monitor and control the Wi-Fi network 10. The configuration can define security, encryption, SSID, WPA settings, device certificates, prioritization, time of day, etc. In an embodiment, the mobile app is HomePass, available from the Applicant, Plume Design, Inc. Example features of the mobile app include, without limitation:

Wi-Fi hardware is discovered over Bluetooth so the system is up and running in minutes Intuitive self-install feature, which eliminates the need for technician costs and scheduling Advanced, automatic identification of devices in the home, complete with icons and names.

View how the network is connecting with a visual topology representation of all access points and connected devices Creates flawless connectivity across device types, rooms, and complex environments using AI-based optimization Provides complex network visibility with unique device fingerprinting and speed tests The cloud-coordinated system harmonizes legacy deployments via OpenSync-compatible hardware Privacy Manager to temporarily freeze visibility Parental control tools to set healthy boundaries for access and usage Guest Manager for access permissions and passwords Content Manager to filter and block unwanted websites and ads for parents and more Digital Wellbeing monitors screen time with scheduled freezes and pauses Online protection from malicious content-Learn more about protecting homes in the connected age Real-time threat database IoT anomaly detection and device quarantine Intrusion detection and outside threat blocking Motion detection via radio waves to let subscriber-owned devices become sensors to detect expected and unexpected movement No need to remember to enable the system, the system turns on and off automatically through GPS of primary devices See movement patterns over the course of time within the mobile app

§ 4.0 WI-FI NETWORK WITH WIRED AND WIRELESS CONNECTIVITY

Again, the wireless access points 14, 18, 22 include both the Wi-Fi radios 104A, the cellular radios 104B, and the network interface 110. The network interface 110 can include an Ethernet connection to the modem/router 30. In an embodiment, the cellular radios 104B can provide a backup connection to the Ethernet connection, for connectivity to the Internet. Of note, the access point 14, 18, 22 with the cellular radios 104B can be referred to as a gateway 30A node. That is, the term gateway 30A is meant to cover any access point 14, 18, 22, modem/router, etc. or combination thereof that enables connectivity to the Internet 12 for the Wi-Fi network 10. Note, in some embodiments, a modem is separate from the access point 14, 18, 22. In other embodiments, the access point 14, 18, 22, include a router. In still other embodiments, the access point 14, 18, 22 can include a modem/router. Those skilled in the art will recognize various approaches are contemplated and all such equivalents are considered herewith.

Figure 5:
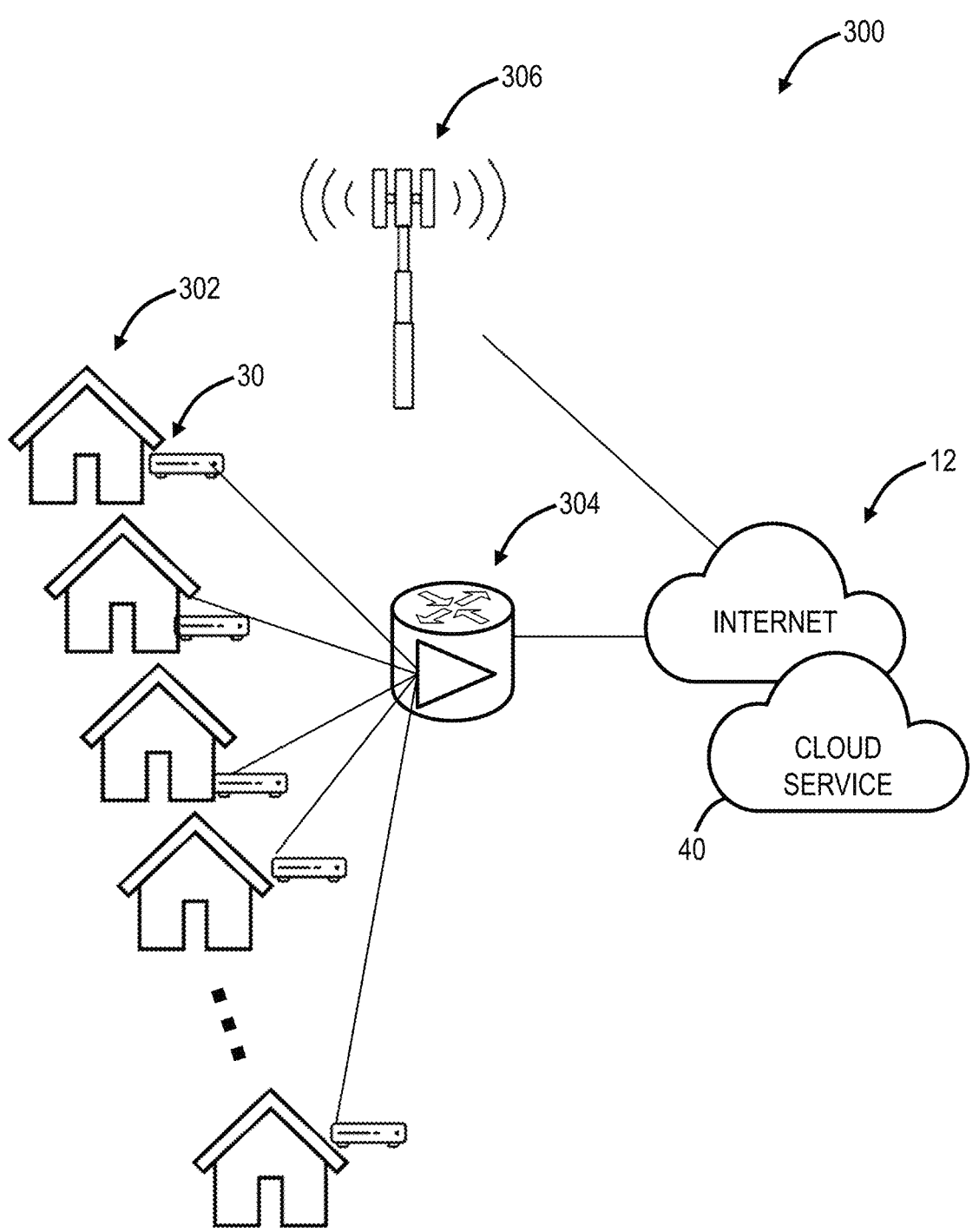
FIG. 5 is a network diagram of a portion of a network associated with a network operator.

FIG. 5 is a network diagram of a portion of a network 300 associated with a network operator. In this example, the network operator includes both wired and wireless broadband in the same geographical area, represented by homes 302. For example, the wired broadband can be via modems/routers 30 that can connect ultimately to a cable modem termination system (CMTS) 304 (or some other type of wired infrastructure, e.g., DSL, Passive Optical Network (PON), Hybrid Fiber Coax (HFC), etc.), and the wireless broadband can be via fixed wireless access via the cellular radios 104B in the access points 14, 18, 22 that connect to a base station 306 (e.g., eNodeB, gNodeB, etc.). It would be advantageous to support failover to the wireless broadband in the case of a wired broadband failure, providing reliability, uptime, and high service level agreement (SLA) support. In the case of a single outage, this is not an issue on the wireless network. However, often wired failures are geographically localized. For example, failure of the CMTS 304 causes a burden on the base station 306 because the wired broadband failure is geographically localized to the homes 302. This could dramatically put a burden on the base station 306 or other cellular cells in the area, leading to degradation of services for all mobile users in the area. That is, wired broadband outages tend to be localized and using wireless broadband for failover could inundate the cellular network.

§ 4.1 Fixed Wireless Access System

Figure 6:
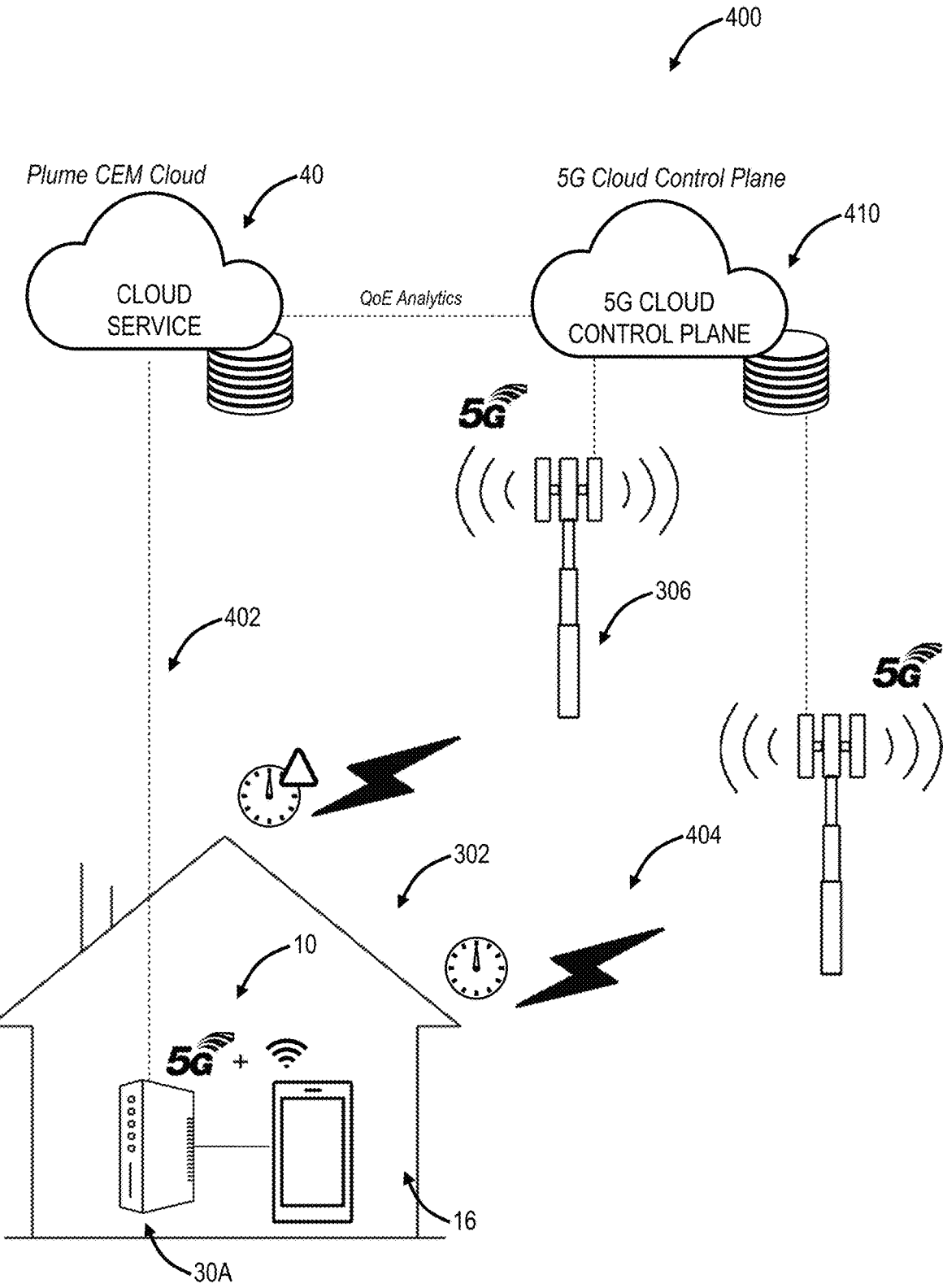
FIG. 6 is a diagram of a fixed wireless access system for wired and/or wireless connectivity.

FIG. 6 is a diagram of a fixed wireless access system 400 for wired and/or wireless connectivity. For illustration purposes, the fixed wireless access system 400 is illustrated with a single home 302 having a modem/router 30 and a Wi-Fi client device 16. Those skilled in the art will recognize the fixed wireless access system 400 contemplates multiple locations, including homes, businesses, store, library, mall, sporting area, or any location where a Wi-Fi network 10 is deployed. Further, the fixed wireless access system 400 contemplates use with various different Wi-Fi networks 10, with various different network operators, etc. Also, the fixed wireless access system 400 contemplates use with any of the various wired and/or wireless connectivity schemes described herein.

The cloud service 40 is configured to connect to the Wi-Fi network 10, either via a wired connection 402 and/or a wireless connection 404. In an embodiment, the cloud service 40 can be utilized for configuration, monitoring, and reporting of the Wi-Fi networks 10 in the homes 302 or other locations. The cloud service 40 can be configured to detect outages such as for the wired connections 402. For example, this functionality is described in commonly-assigned U.S. patent application Ser. No. 17/700,782, filed Mar. 22, 2022, and entitled "Intelligent monitoring systems and methods for Wi-Fi Metric-Based ISP Outage Detection for Cloud Based Wi-Fi Networks," the contents of which are incorporated by reference in their entirety.

Also, the cloud service 40 can connect to a 5G cloud control plane 410 and can determine 5G to Wi-Fi quality of experience (QoE) monitoring and application prioritization controls for increased service consistency. QoE analytics can be shared with 5G cloud control plane 410 for network optimization feedback.

In an embodiment, the access points 14, 18, 20, 22 and/or gateway 30A can include OpenSync support for communicating with the cloud service 40.

§ 5.0 ENROLLMENT IN WI-FI SHARING COMMUNITY

Figure 7:
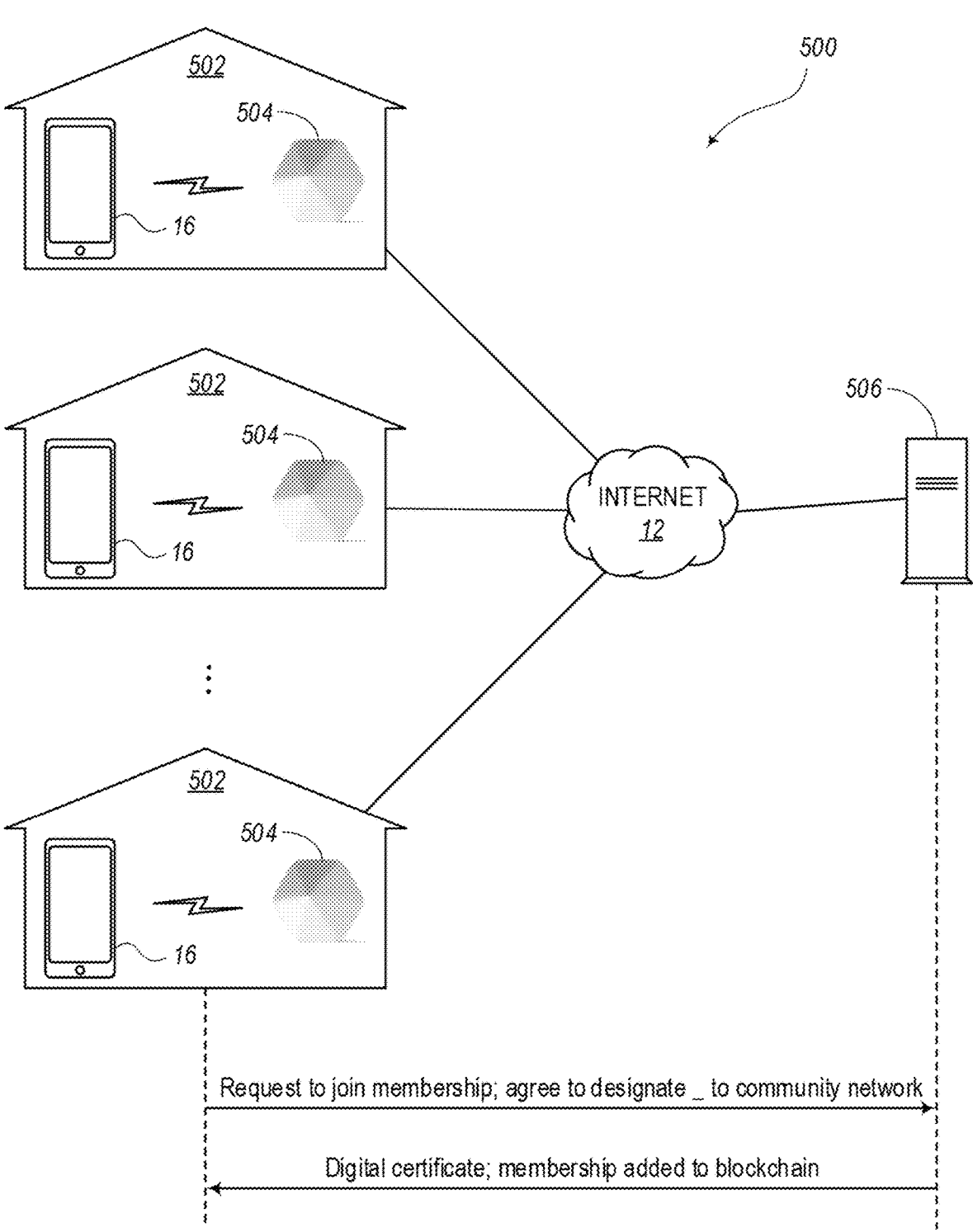
FIG. 7 is a diagram illustrating an embodiment of a system for allowing users to enroll in a Wi-Fi sharing community.

FIG. 7 is a diagram illustrating an embodiment of a system 500 for allowing users to enroll in a Wi-Fi sharing community. The system 500 includes a number of homes 502, which may also be configured as businesses, schools, libraries, cafes, etc. Each home 502 is part of an independent Wi-Fi network (e.g., Wi-Fi network 10), which may be controlled, extended, etc. via one or more access points 504 (e.g., access point 14, 22) and/or one or more Wi-Fi devices (e.g., mesh node 18, repeater 20, modem/router 30, etc.). Each access point 504 (or Wi-Fi device) may be configured to allow one or more users to use their Wi-Fi client device 16 to access the Internet 12 via the respective Wi-Fi network associated with the particular home 502. Each independent Wi-Fi network in each home 502 may be the same as or similar to the embodiments described above. The system 500 further includes a server 506, which may be the same as or similar to the server 200 of FIG. 4 and/or may be defined by the cloud service 40 described above.

In the embodiment described with respect to FIG. 7, the server 506 may be configured as a cloud-based server, a community server, a blockchain server, etc. The server 506 may be configured to issue digital certificates to user devices (e.g., Wi-Fi client device 16) allowing a Wi-Fi network owner (e.g., owner of the home 502) and/or other users in the home to become members of a Wi-Fi sharing community. Thus, the owner of each independent Wi-Fi network can enroll as a member of this Wi-Fi sharing community. For enrollment, each member agrees to designate a portion of bandwidth of the member's Wi-Fi network for use by other members as a hotspot. Also, the server 506 is configured to issue a digital certificate to each member to allow the member to utilize any Wi-Fi network in the Wi-Fi sharing community. It may be noted that multiple members in a home 502 may use multiple user devices to roam to wherever other members are located.

To set up the users or owners as "members," a prospective member sends a message to the server 504. For example, the user's device may include an option (e.g., a selectable button) to opt in to the sharing service. The prospective member agrees to be willing to allocate or designate a certain percentage of his or her bandwidth to the global community to allow other members to use as needed. In response to receiving an agreement to share a portion of their bandwidth, the server 506 is configured to send a digital certificate back to the members, giving them the opportunity to "roam" outside their own homes 502 and use the Wi-Fi networks of other members.

§ 5.1 Transactions with Respect to Member Account

Figure 8:
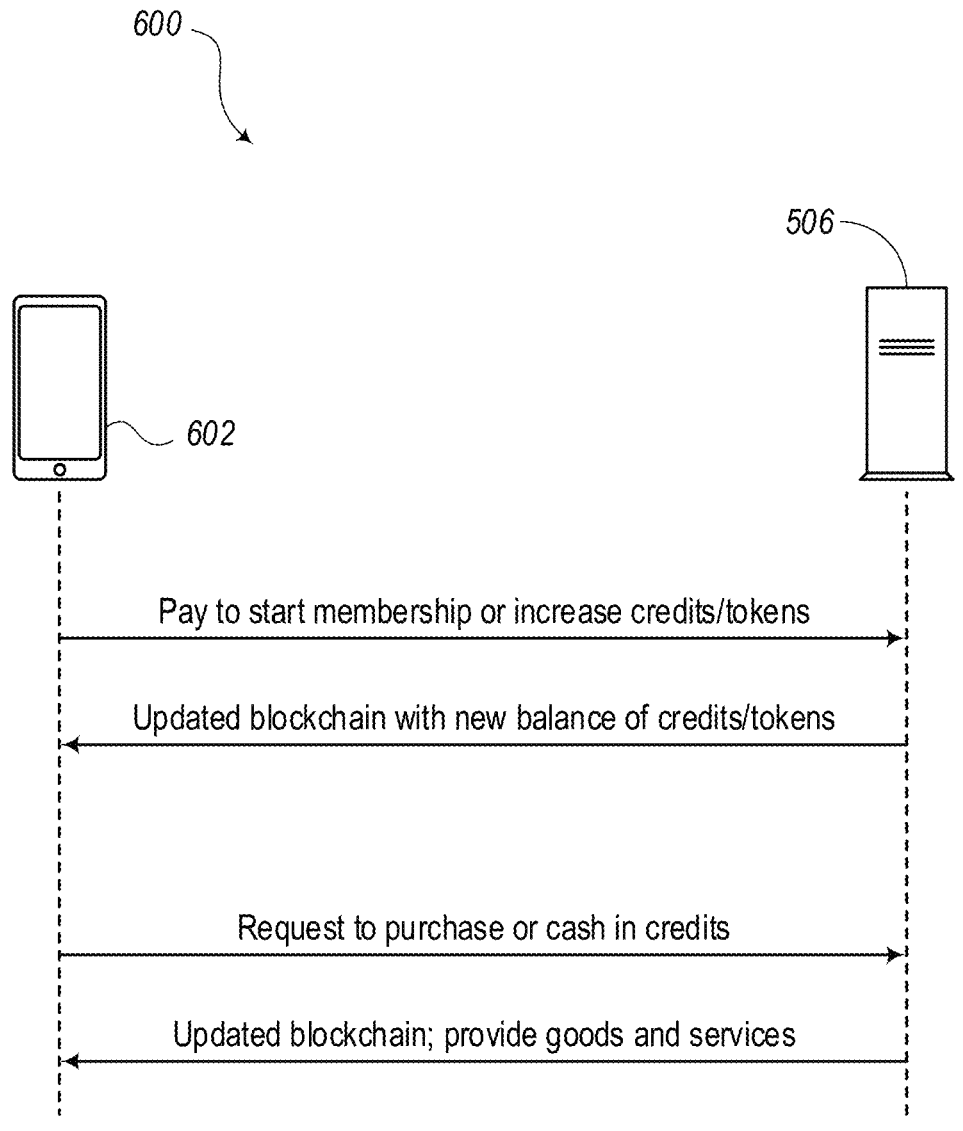
FIG. 8 is a diagram illustrating an embodiment of a system for enabling transactions between a member and a server.

FIG. 8 is a diagram illustrating an embodiment of a system 600 for enabling transactions between a member device 602 and the server 506. It may be noted that the system 500 of FIG. 7 is set up initially to enable the sharing of resources. However, at this point, there is no account or balance. Thus, the following describes how each member can obtain a positive balance to allow them to utilize the Wi-Fi network of other members as well as utilize any positive balance toward goods and services.

In some embodiments, the member (e.g., using the member device 602) may be able to utilize the Wi-Fi networks of other members and incur a debit amount to be paid later. In other embodiments, the member may only be able to utilize other networks if there is a positive balance in the member's account. Therefore, using any suitable payment method, the member may used their member device 602 to send money, currency, cryptocurrency, etc. to the server 506 to build up their account, which can then be used to pay for the use of other networks. The server 506 may then send back an update the member's account balance, which can be recorded using blockchain technology.

Also, if a member has a positive balance and perhaps does not wish to use the roaming service, the member can cash in positive credits or purchase merchandise, goods, services, software, hardware, etc. and/or obtain discounts for such. The member device 602 may communicate requests for goods or services to the server 506. In response, the service may organize the transportation of goods and/or provide services accordingly and provide an update (e.g., new block) in the blockchain that include a debit to the user's account balance to pay for or redeem the goods or services.

§ 5.2 Sharing Wi-Fi Connectivity

Figure 9:
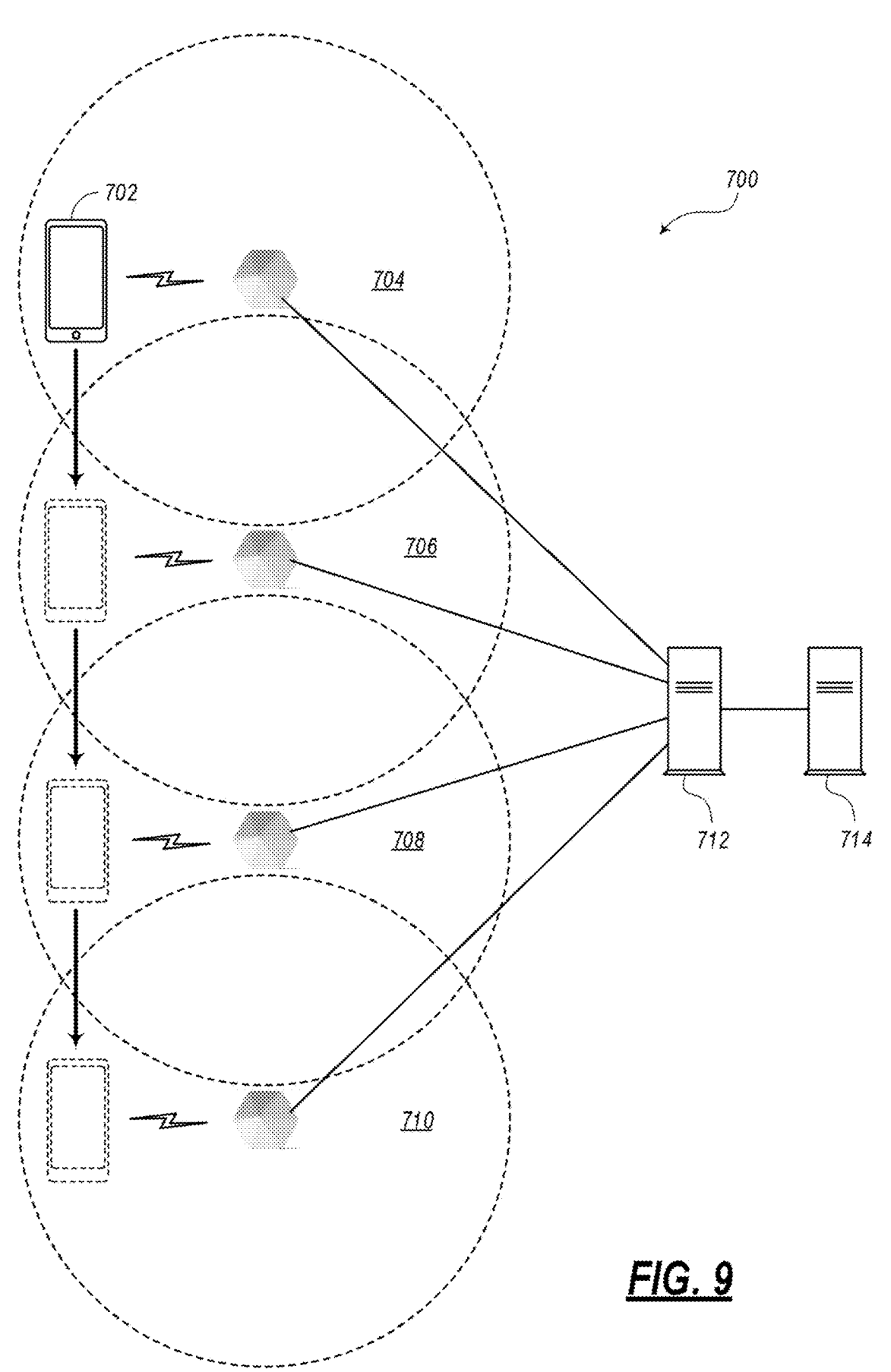
FIG. 9 is a diagram illustrating an embodiment of a system for allowing a member of the Wi-Fi sharing community to use the Wi-Fi networks of other members in order to roam.

FIG. 9 is a diagram illustrating an embodiment of a system 700 for allowing a member using a device 702 (e.g., Wi-Fi client device 16) to actually use the Wi-Fi networks of other members in the Wi-Fi sharing community. In the example shown in FIG. 9, the member may initially use their own Wi-Fi network 704 (e.g., within the premises of the member's home 502). Of course, since this is the normally use, no roaming or Wi-Fi sharing is initially used.

However, suppose the member wishes to leave his or her home 502 and walk down the street, drive to a nearby store, travel to another city, etc. while also using Wi-Fi connectivity. Suppose the member wishes to access the Internet via a second Wi-Fi network 706 when the member is within Wi-Fi range. Then, the member may travel or roam to a third Wi-Fi network 708, then a fourth Wi-Fi network 710, as so on. While within the connectivity range of each Wi-Fi network 706, 708, 710, the device 702 is configured to negotiate with the system 700 to obtain Wi-Fi connectivity at each network, as needed.

For example, each Wi-Fi network 704, 706, 708, 710, etc. may be connected to a validation server 712 (e.g., RADIUS server, Amazon Web Services (AWS) server, etc.). The validation server 712, in turn, may be connected to a sharing community server 714 (e.g., server 506). The server 714 may then check the eligibility requirements, validation criteria, etc. to determine if bandwidth should be allocated to the device 702. In some embodiments, the validation server 712 and server 714 may be configured as a single device or node.

The validation process may include the device 702 asking the member Wi-Fi network 706, 708, 710, etc. for permission to join the particular hotspot. For example, the device 702 may provide some type of identification, such as the digital certificate as provided by the server 506 as described above with respect to FIG. 7. The Wi-Fi network 706, 708, 710, etc. may then provide the ID information (e.g., digital certificate) to the validation server 712 to ask if it is valid. The validation server 712 may then ask the server 714 if the requesting member qualifies to obtain the local Wi-Fi connectivity.

The server 714 may then check its records to see if the user is eligible, if they have a valid digital certificate, if their account balance is positive, if their membership status is fine, etc. If validated, the server 714 (e.g., acting as a validator) reverses the path and may provide token information regarding the status of the member, the member's account balance, and/or other pertinent information back to the validation server 712. If validated, the validation server 712 informs the equipment (e.g., access point) of the nearby Wi-Fi network that the member is allowed to gain access and may provide any limitations as needed (e.g., based on the member's account, the member may only use a certain amount of data). Then, the Wi-Fi network 706, 708, 710, etc. then notifies the nearby device 702 that the member may connect to the network, acting as a hotspot. This negotiation process may be executed in a short amount of time to allow the member to quickly hop from one Wi-Fi network 706, 708, 710, etc. to another. This hand off process may be seamless and can be executed without the user's knowledge. Also, this can be performed automatically without the need for the user to search for the nearby hotspots, enter login information, etc.

§ 5.3 Method for Sharing Wi-Fi Resources

FIG. 10 is a diagram illustrating an embodiment of a method 800 for creating and implementing a Wi-Fi sharing community or global Wi-Fi network. For example, the method 800 may be performed by the server 506, 714. In particular, the method 800 may be implemented as hardware (e.g., in the processor 202), as software or firmware (e.g., in the memory 210, and/or any other suitable combination of hardware, software, and firmware. In some embodiments, the method 80 may be implemented as a program 216.

As illustrated, the method 800 includes the step of providing, for an owner of each independent Wi-Fi network, an opportunity to enroll as a member of a Wi-Fi sharing community, as indicated in block 802. For enrollment, each member agrees to designate a portion of bandwidth of the member's Wi-Fi network for use by other members as a hotspot. Also, the method 800 includes the step of issuing a digital certificate to each member to allow the member to utilize any Wi-Fi network in the Wi-Fi sharing community.

The method 800 may also include the step of allowing each member to enter a value equal to a maximum percentage of the respective Wi-Fi network that can be designated for use by other members. The method 800 may also create one or more membership files to include membership information and digital certificates of the members in the Wi-Fi sharing community. For example, the membership files may be created using blockchain technology.

In addition, the method 800 may also include the step of creating one or more digital ledgers configured to record a number of digital tokens in an account associated with each member. When a first member uses a Wi-Fi network of a second member, for example, the method 800 may include a) deducting a first number of digital tokens from the first member's account, and b) crediting a second number of digital tokens to the second member's account. The method 800 may also include a) receiving metrics tracked by the second member's Wi-Fi network, where the metrics may be related to the first member's use of the second member's Wi-Fi network, and b) determining the first and second numbers (described above) based on metrics. The metrics may include one or more of an amount of time that the first member used the second member's Wi-Fi network, an amount of bandwidth used, and an amount of data consumed. In some embodiments, the first number may be the same as the second number. The method 800 may also include the step of creating the one or more digital ledgers using blockchain technology. Also, the method 800 may include allowing the members to exchange digital tokens in their respective account in order to purchase or receive discounts on hardware, software, goods, services, currency, and/or cryptocurrency.

When a member is roaming, the method 800 may be configured to seamlessly hand off the member's connectivity from a first Wi-Fi network either to a second Wi-Fi network or to a cellular network. This step of seamlessly handing off the member's connectivity may be performed automatically without user intervention or login actions. The method 800 may also include the steps of a) receiving the digital certificate associated with the roaming member from the second Wi-Fi network based on a permission request provided by a user device of the roaming member to the second Wi-Fi network, and b) upon validating that the digital certificate associated with the roaming member is legitimate, signaling the second Wi-Fi network to permit connectivity of the user device of the roaming member with the second Wi-Fi network. The method 800 may utilize a RADIUS server for assisting with validation of digital certificates. Also, the method 800 may include the step of sending information about an amount of available roaming connectivity credits associated the roaming member to the second Wi-Fi network to limit usage of the second Wi-Fi by the roaming member.

The plurality of independent Wi-Fi networks as described herein may be located in multiple countries, governmental jurisdictions, or service areas. Also, the Wi-Fi sharing community may be established whereby the members do not incur roaming penalties for using Wi-Fi networks of other members in different countries, governmental jurisdictions, or service areas. The method 800 may also allow each member to use a related user device to temporarily toggle off participation in the Wi-Fi sharing community as desired.

Therefore, the systems and methods associated with the Wi-Fi sharing community and the plan for implementing this community may provide benefits for all the users. Although Wi-Fi networks are normally independent or fragmented, whereby only a small group of users may use each Wi-Fi network, the sharing of Wi-Fi connectivity allows users to roam without additional charges. Also, when set up correctly, a user may utilize their Wi-Fi network for use by multiple users and receive many credits, which can then be used for the member's own roaming needs or may cash in the credits for extra goods and services.

In use, the Wi-Fi sharing community may allow members to not only have Wi-Fi connectivity in their own home, but also be able to walk down the street, for example, to take their child to the bus stop or to school or to go to the local grocery store and have continuous service. The system can hand over a member from one house to the next and so on. This may be similar to a home network distribution system where a person may move about the house, for example, from an office to a living room to a kitchen, and the Wi-Fi system hands the user over from one node or hotspot to another throughout the home 502. The same scenario is used in this system when a user steps outside their house and walks down the street, where they can be handed over to another node. If there are no nodes available, the system may be configured hand the user over to a cellular network, a Long Range (LoRa) network, or some other wireless network, as needed to maintain connectivity to the Internet.

In some respect, the systems 500, 600, 700 may be performed without certain centralization aspects. That is, by using blockchain, the servers 506, 712, 714 may encrypt data (e.g., member account information, digital certificates, etc.) in blockchain and share one or more blockchain files with multiple components in the system for appropriate redundancy. In some embodiments, the server 506, 714 may create or jumpstart a new blockchain file, but it then be shared among the user's devices to ensure security. Also, the system 500, 600, 700 may be anonymous, secure, and encrypted.

When a member allows other members to use their network, they can receive credits or tokens (e.g., NFTs) for enabling their system to be used as a hotspot for others. Then, when the member needs to gain connectivity, they can use their accumulated credits or tokens. Since the community is not bound by any governmental territories, the Wi-Fi sharing community may be a true global community.

The Wi-Fi sharing community, as described in the present disclosure and in the spirit of other Plume products, may be referred to as "WorldPass." A user device may be configured to initially ask the user, "Do you want to participate in WorldPass? Yes or No." There may be selection button or a toggle switch to turn on or off the service. When on, the member can benefit from the features described herein.

The digital certificate associated with each member may also be configured as any type of identification. For example, the digital certificate may be an authentication certificate, an ID digital certificate, etc. allowing the member hop on a new hotspot. Again, the hotspot needs to validate or confirm if the member device has provided a legitimate authentication certificate or not. The system can look back to the blockchain to determine if a valid digital certificate has been issued to the user or if it has expired, been revoked or cancelled, been toggled off, etc. The server 506, 714 or other device can check the blockchain and determine the validity or legitimacy of the user's membership status.

After the user has been validated, they may use the nearby Wi-Fi network. The Wi-Fi equipment at that hotspot (e.g., home 502) may then track the usage metrics of the roaming member. The metrics are sent back to the server and logged in and/or updated in another blockchain file. This can be repeated for each user and new encrypted blocks can be added to the chain to track the current account balances of credits and debits based on members using other members' networks.

§ 6.0 CONCLUSION

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A server comprising:
   a processor, memory, and a network interface configured for communication with a plurality of independent Wi-Fi networks, the processor configured to:
      provide, for an owner of each independent Wi-Fi network, an opportunity to enroll as a member of a Wi-Fi sharing community, whereby, for enrollment, each member agrees to designate a portion of bandwidth of the member's Wi-Fi network for use by other members as a hotspot;

create one or more membership files to include membership information and digital certificates of the members in the Wi-Fi sharing community, wherein the one or more membership files are created using blockchain technology; and issue, in response to and based on the provided opportunity and agreeing by each member, a digital certificate to each member to allow the member to utilize any Wi-Fi network in the Wi-Fi sharing community, such that utilization of a Wi-Fi network in the Wi-Fi sharing community is based on authentication of a device of the member as compared to information stored in a distributed ledger using blockchain technology.

2. The server of claim 1, wherein the processor is further configured to allow each member to enter a value equal to a maximum percentage of the respective Wi-Fi network that can be designated for use by other members.

3. The server of claim 1, wherein the processor is further configured to create the one or more membership files using blockchain technology.

4. The server of claim 1, wherein the processor is further configured to create one or more digital ledgers configured to record a number of digital tokens in an account associated with each member.

5. The server of claim 4, wherein, when a first member uses a Wi-Fi network of a second member, the processor is further configured to:

deduct a first number of digital tokens from the first member's account, and credit a second number of digital tokens to the second member's account.

6. The server of claim 5, wherein the processor is further configured to:

receive metrics tracked by the second member's Wi-Fi network, the metrics related to the first member's use of the second member's Wi-Fi network, and determine the first and second numbers based on metrics.

7. The server of claim 6, wherein the metrics include one or more of an amount of time that the first member used the second member's Wi-Fi network, an amount of bandwidth used, and an amount of data consumed.

8. The server of claim 5, wherein the first number is the same as the second number.

9. The server of claim 4, wherein the processor is further configured to create the one or more digital ledgers using blockchain technology.

10. The server of claim 4, wherein the processor is further configured to allow members to exchange digital tokens in their respective account in order to purchase or receive discounts on hardware, software, goods, services, currency, and/or cryptocurrency.

11. The server of claim 1, wherein, when a member is roaming, the processor is further configured to seamlessly hand off the member's connectivity from a first Wi-Fi network either to a second Wi-Fi network or to a cellular network.

12. The server of claim 11, wherein the processor seamlessly hands off the member's connectivity automatically without user intervention or login actions.

13. The server of claim 11, wherein the processor is further configured to:

receive the digital certificate associated with the roaming member from the second Wi-Fi network based on a permission request provided by a user device of the roaming member to the second Wi-Fi network, and upon validating that the digital certificate associated with the roaming member is legitimate, signaling the second Wi-Fi network to permit connectivity of the user device of the roaming member with the second Wi-Fi network.

14. The server of claim 13, wherein the processor is further configured to utilize a RADIUS server for assisting with validation of digital certificates.

15. The server of claim 13, wherein the processor is further configured to send information about an amount of available roaming connectivity credits associated the roaming member to the second Wi-Fi network to limit usage of the second Wi-Fi by the roaming member.

16. The server of claim 1, wherein the independent Wi-Fi networks are located in multiple countries, governmental jurisdictions, or service areas, and wherein members do not incur roaming penalties for using Wi-Fi networks of other members in different countries, governmental jurisdictions, or service areas.

17. The server of claim 1, wherein the processor is further configured to allow each member to use a related user device to temporarily toggle off participation in the Wi-Fi sharing community as desired.

18. A method comprising steps of:

providing, for an owner of each of a plurality of independent Wi-Fi networks, an opportunity to enroll as a member of a Wi-Fi sharing community, whereby, for enrollment, each member agrees to designate a portion of bandwidth of the member's Wi-Fi network for use by other members as a hotspot;

creating one or more membership files to include membership information and digital certificates of the members in the Wi-Fi sharing community, wherein the one or more membership files are created using blockchain technology; and issuing, in response to and based on the provided opportunity and agreeing by each member, a digital certificate to each member to allow the member to utilize any Wi-Fi network in the Wi-Fi sharing community, such that utilization of a Wi-Fi network in the Wi-Fi sharing community is based on authentication of a device of the member as compared to information stored in a distributed ledger using blockchain technology.

19. The method of claim 18, further comprising the steps of:

creating one or more digital ledgers configured to record a number of digital tokens in an account associated with each member.

*   *   *   *   *